RALPH PAUL ALEX
INVENTOR

BY M. B. Tasker
ATTORNEY

Oct. 11, 1955

R. P. ALEX 2,720,271

HELICOPTER CONTROL MECHANISM

Original Filed May 20, 1947

RALPH PAUL ALEX
INVENTOR

BY *M. B. Tasker*

ATTORNEY

RALPH PAUL ALEX
INVENTOR

ATTORNEY

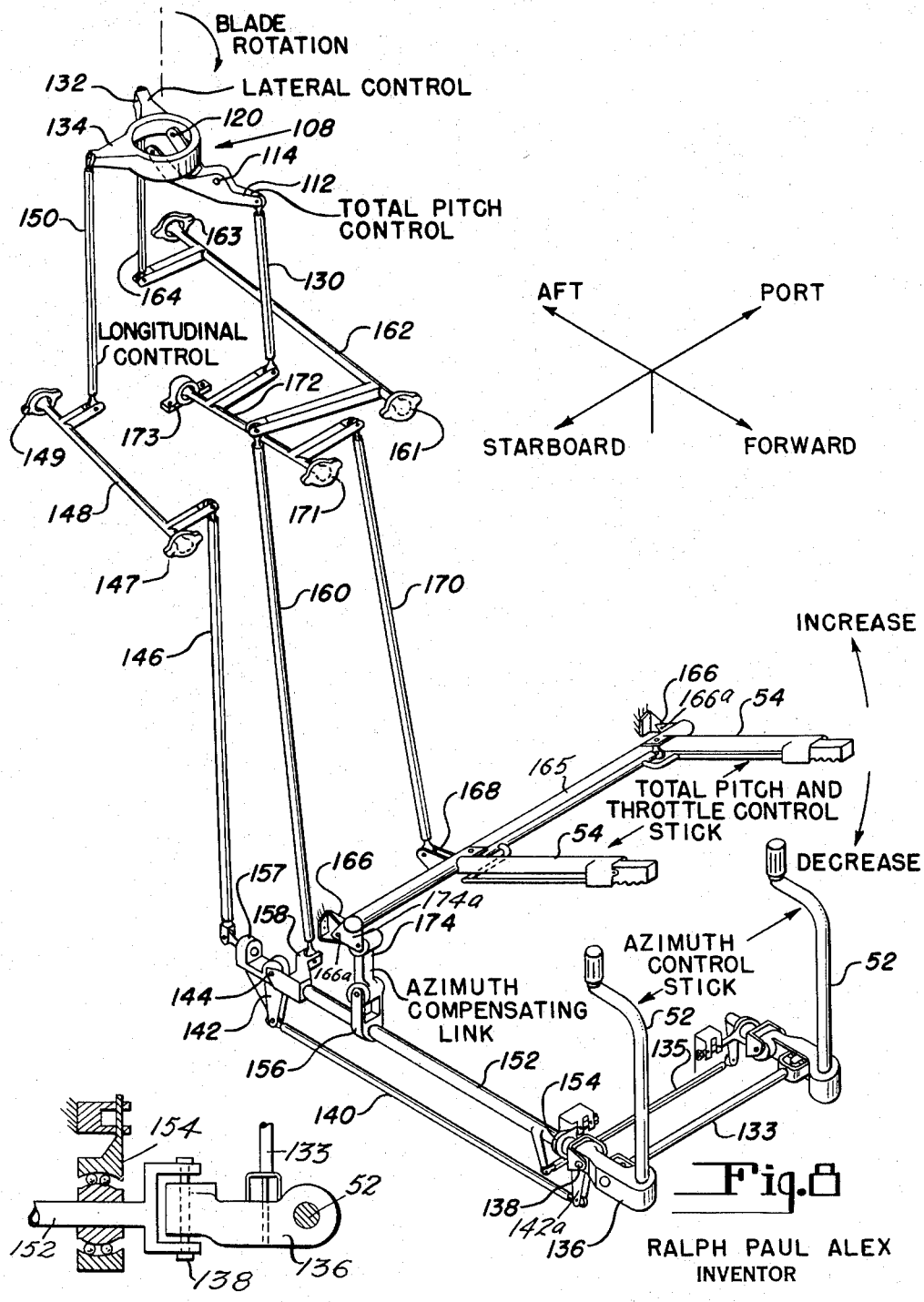

United States Patent Office 2,720,271
    Patented Oct. 11, 1955

2,720,271

HELICOPTER CONTROL MECHANISM

Ralph P. Alex, Fairfield, Conn., assignor to United Aircraft Corporation, East Hartford, Conn., a corporation of Delaware Original application May 20, 1947, Serial No. 749,256, now Patent No. 2,629,452, dated February 24, 1953. Divided and this application January 12, 1953, Serial No. 330,832

3 Claims. (Cl. 170—160.25)

This application is a division of my copending application Serial No. 749,256, filed May 20, 1947, and assigned to the assignee of this application, which issued February 24, 1953, as Patent No. 2,629,452.

This invention relates to helicopters and more particularly to simplification of the rotor hub construction and the pitch changing mechanism so that the cost of production thereof may be materially reduced.

Accordingly, it is an object of this invention to provide a simple "clockcase" type of rotor head construction wherein the component parts are mounted between a pair of similar plates.

Another object is to provide a helicopter wherein the rotor blades will always be normal to the flapping or coning axis.

A further object is to provide a blade rest which underlies the blade in all flight conditions.

Another object is to provide blade stops which may be readily serviced.

A further object is to provide a system of free-floating control stars which eliminates contact between the stars and the rotor drive shaft, thus eliminating bearing surfaces therebetween.

A still further object is to provide a swash plate system for controlling the blade pitch which is greatly simplified and cheaper to produce.

Another object is to provide a simple but strong pitch control mechanism including the controls therefor.

Other objects and advantages will be apparent from the specification and claims, and from the accompanying drawings which illustrate the presently preferred embodiment of my invention.

In the drawings,

Fig. 8 is a perspective showing of the dual control system for the blade pitch; and Fig. 9 is a detail on an enlarged scale of part of Fig. 8.

Figure 1:
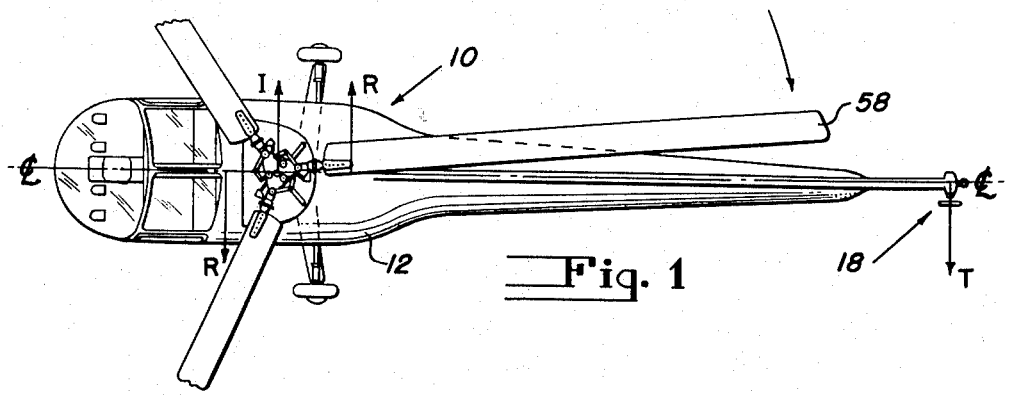
Fig. 1 is a top plan view of a helicopter constructed according to my invention.
Figure 2:
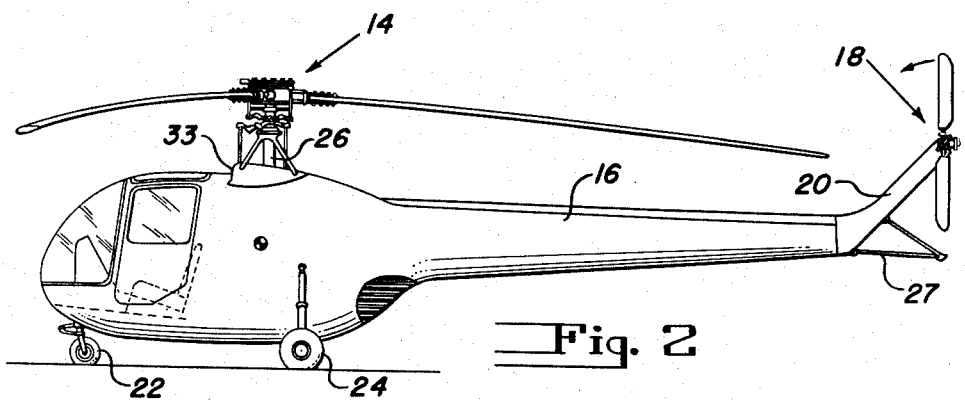
Fig. 2 is a side-elevational view of the helicopter shown in Fig. 1.
Figure 3:
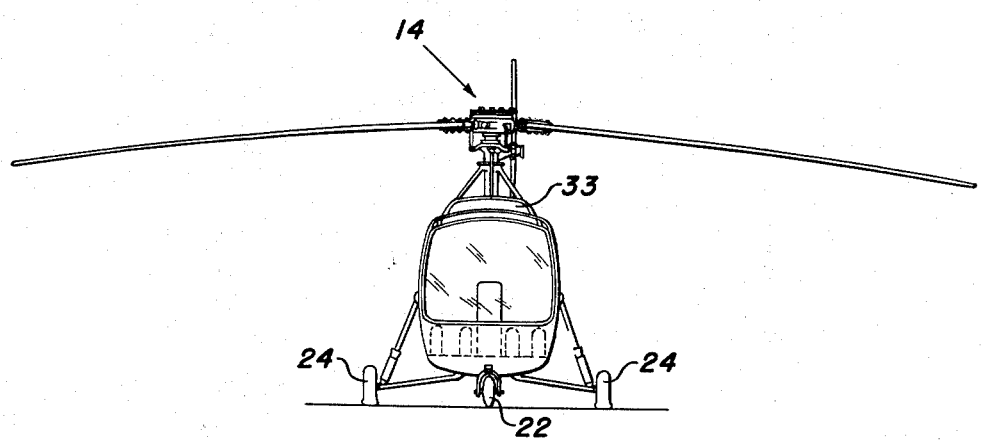
Fig. 3 is a front elevational view of the helicopter shown in Fig. 1.

Referring to Figs. 1 through 3, a helicopter is shown having a body generally denoted by the numeral 10, which is comprised of a central portion 12 which houses the engine and has the main rotor 14 mounted thereon, a forward portion comprising a pilot's compartment, and a tail cone 16 which has a tail rotor 18 and the tail rotor pylon 20 mounted thereon. The landing gear for the helicopter consists of a small nose wheel 22 and two laterally disposed wheels 24. A tail skid 27 is mounted on the tail rotor pylon 20 to protect the tail rotor blades from damage in case of a tail down landing.

Figure 4:
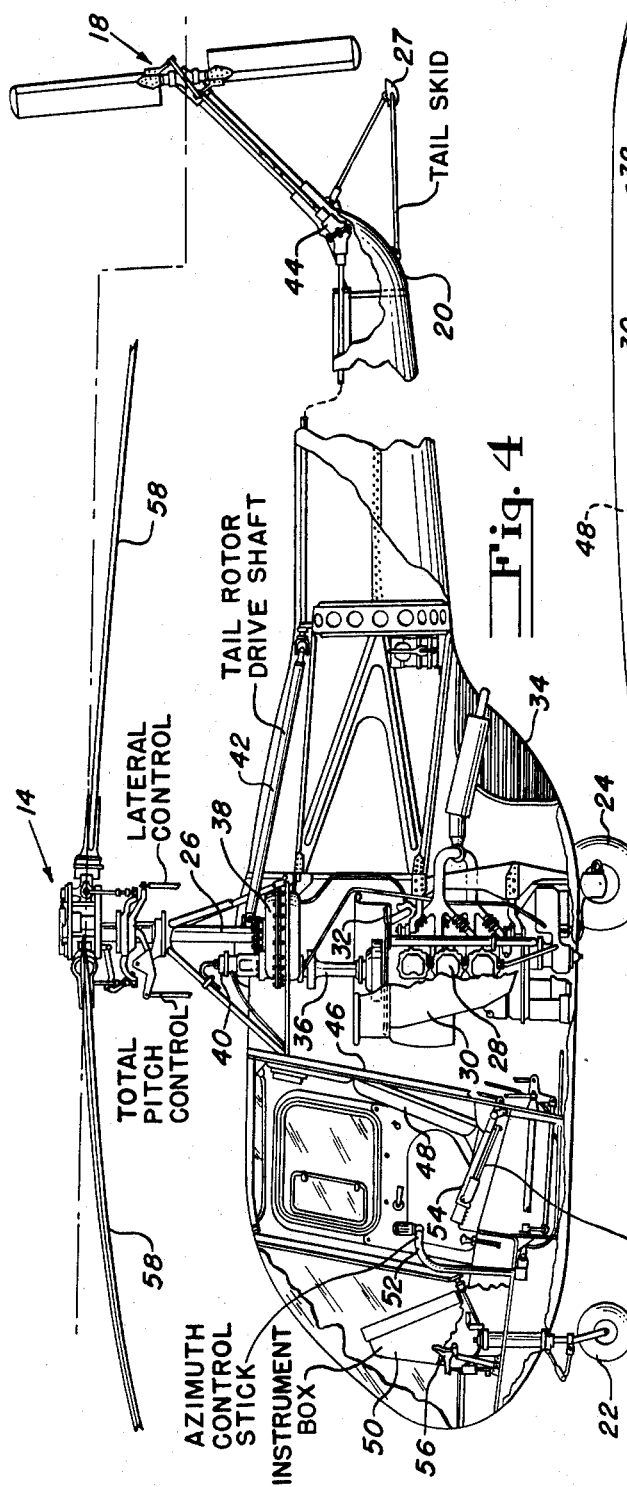
Fig. 4 is an inboard profile or a side-elevational view with parts broken away to show the general layout of the component parts.
Figure 5:
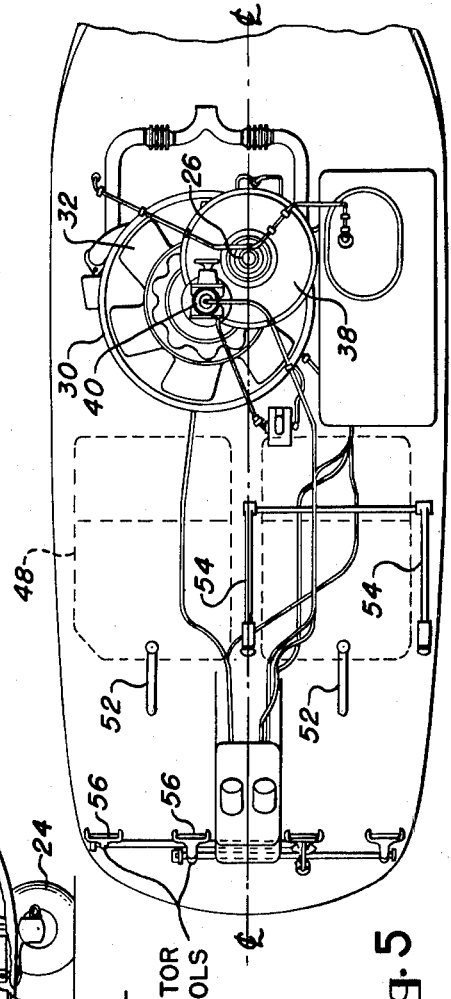
Fig. 5 is a top profile view showing the relationship of the controls to the pilot seat and of the engine with respect to the center line of the ship.

Referring now to Figs. 4 and 5, the engine 28 is mounted in the central portion 12 of the helicopter body with its drive shaft in a vertical position and is surrounded by a cowling 30 which is open at the top to admit engine cooling air. An engine driven fan 32 is mounted within and just below the throat of the cowling 30 to blow the cooling air downwardly and over the engine cylinders. The cooling air is drawn through an opening 33 (Figs. 2 and 3) in the upper portion of the fuselage just forward of the main rotor drive shaft 26 and is exhausted through the grill 34 in the after portion of the central section of the fuselage. The engine drive shaft 36 drives the main rotor 14 and the tail rotor 18 through reduction gearing contained within housing 38. On the upper portion of the reduction gear housing 38 is the drive take-off 40 for the tachometer generator (not shown). The tail rotor drive shaft 42 is driven at a high speed from this take-off and the speed thereof is reduced in reduction gearing in the tail rotor pylon 20. This enables the long tail rotor drive shaft 42 to be of small diameter.

The pilot's compartment is separated from the engine compartment by a firewall 46 and provides seating capacity for two persons. This section is comprised primarily of transparent plastic to afford a wide range of visibility which is compatible with the extreme maneuverability of this type of aircraft. The transparent plastic sections of the top portion of the pilot's compartment are preferably dyed green to reduce the glare of the sun.

The occupants of the pilot's compartment sit side by side in seats 48. An instrument box 50 is provided between the seats 48 in a forward position within the transparent plastic nose bubble.

Dual controls are provided and consist of an azimuth control stick 52, a total pitch and throttle control stick 54, and foot pedals 56 to control the pitch and consequently the torque of the tail rotor 18. The azimuth stick 52 and the total, or collective, pitch stick 54 control the pitch setting of the main rotor blades 58 in a manner which will be more fully explained hereinafter.

Figure 6:
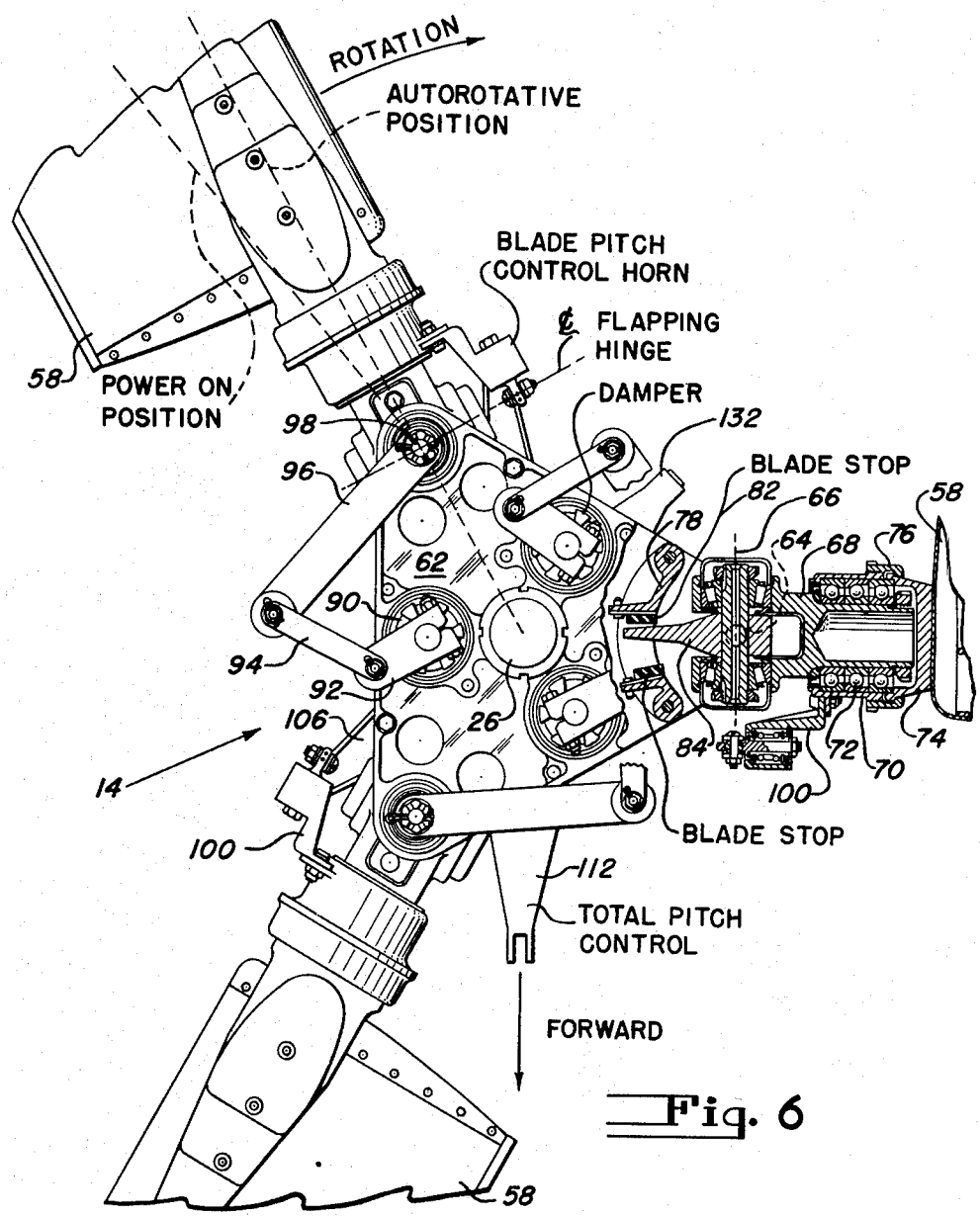
Fig. 6 is a top plan view of the main rotor with parts broken away to show the component parts in detail.
Figure 7:
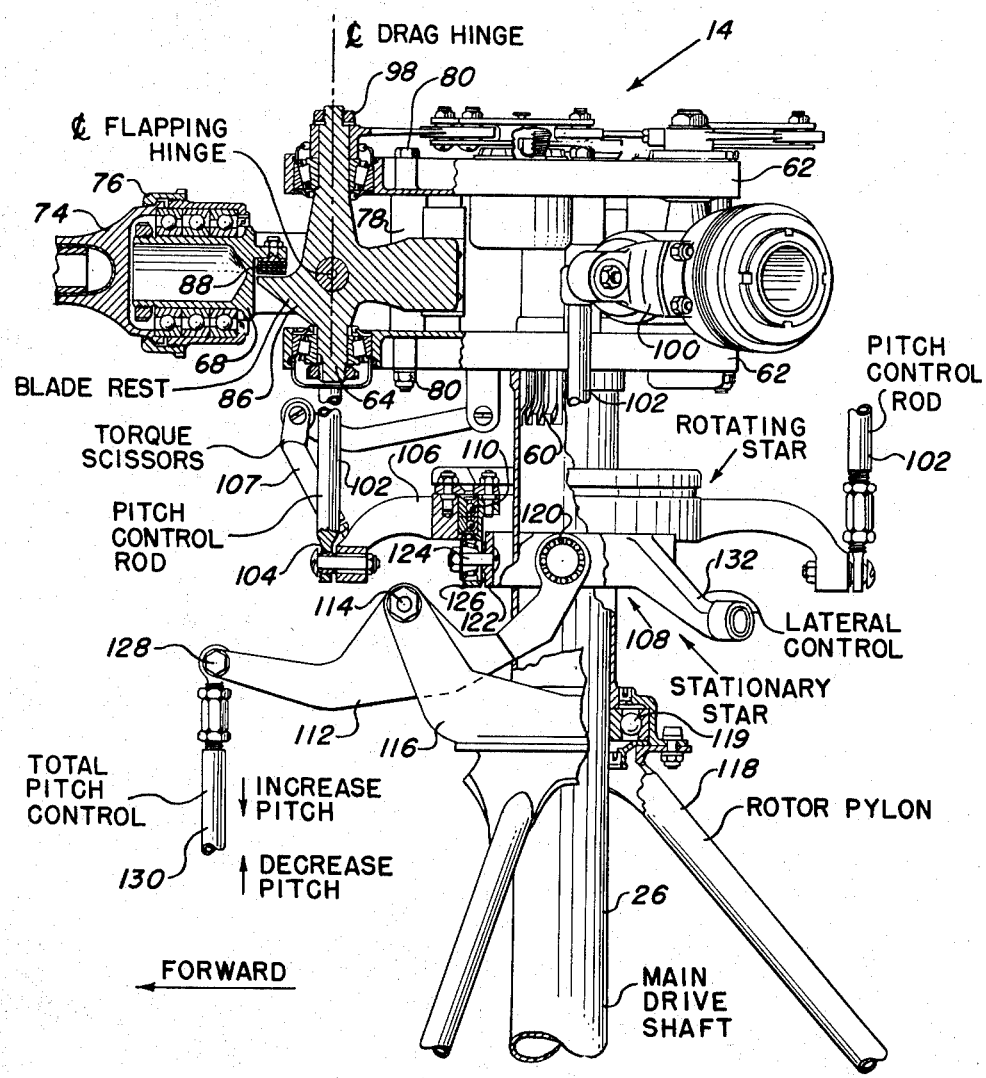
Fig. 7 is a side-elevational view of the rotor shown in Fig. 6 with parts broken away.

Referring now to Figs. 6 and 7, which show the details of the hub assembly and the pitch controls, the blades 58 are of all metal construction and are fabricated according to the method disclosed in the copending U. S. application Serial No. 632,620 of Igor I. Sikorsky, assigned to the applicant's assignee, and issued August 12, 1952, as Patent No. 2,606,728.

The main rotor drive shaft 26 drives the hub through splines 60. The hub is comprised of two similar plates 62, 62 which are generally triangular in plan and are separated from each other to permit mounting the essential parts therebetween. In this construction it will be noted that the hub is fabricated in a manner similar to that employed in clockcases where all the parts are mounted between the two faces. The vertical drag hinge 64 is mounted between the two hub plates 62, 62 on substantially the extended radius of the drive shaft 26. The horizontal or flapping hinge 66 intersects the drag hinge 64 at 90°. The stub shaft 68 is pivotally mounted on the flapping hinge 66. A sleeve member 70 is mounted on the stub shaft 68 by means of bearings 72 which allow the sleeve 70 freedom of rotation but prevent axial movement. The blade 58 is mounted on a spar 74 which is held fixed with respect to the sleeve 70 by means of a threaded retention member 76.

As shown in Fig. 6, the blades are in the auto-rotative position, i. e., the longitudinal axis of each blade is substantially aligned with a radius of the drive shaft 26. In the power-on position, the blades will drag back to the position shown in dotted lines. These two positions represent substantially the magnitude of the blade movement around the drag hinge which is desirable. Movement beyond these positions must be restrained and for this purpose blade stops 78 have been mounted vertically between the hub plates 62 by means of bolts 80. The blade stops 78 have rubber cushions 82 mounted on the contacting faces to ease the shock of contact. A paddle shaped finger 84 extends inwardly from the drag hinge pin 64 and is integral therewith. The paddle 84 cooperates with the rubber cushions 82 on the blade stops 78.

Movement of the blade 58 in a vertical plane about the flapping hinge is desirable in flight but the blade must be restrained from movement below a horizontal position so that the blade tips will not strike the ground or the tail cone 16. To restrain such movement, a blade rest 86 has been provided by merely extending a finger outwardly from the drag hinge as best shown in Fig. 7. A rubber cushion 88 is bolted on the stub shaft 68 to cooperate with the blade rest.

Movement of the blade about the flapping hinge 66 results from aerodynamic and dynamic forces and need not be restrained but movement about the drag hinge 64, resulting from the natural hunting action of the blade in forward flight, must be damped to avoid excessive vibration. Accordingly, a damper 90 is provided for each of the blades 58 and is mounted vertically between the hub plates 62. The movement of the blade about the drag hinge is transmitted to the damper arm 92 by means of a link 94 and an arm 96 which is secured on a serrated vertical extension of the vertical hinge 64 by means of a lock nut 98.

The blade pitch control horn 100 is integral with the rotatable sleeve 70 and the blade stub spar 74. Movement of the control horn 100 will change the pitch of the blade 58. As best seen in Figs. 6 and 7, the control horn 100 is connected to the pitch control rod 102 at a point lying on the extended axis of the flapping hinge. Since the flapping hinge moves with the blade 58 about the drag hinge, this point of connection will always lie on the extended axis of the horizontal hinge 66. Therefore as the blade moves about the flapping hinge, there will be no Delta-3 effect, i. e., no decrease in pitch as the blade moves upwardly about the flapping hinge. If it is desired to have a Delta-3 effect, the point of connection between the control horn 100 and the control rod 102 may be moved off the center line of the flapping hinge and away from the axis of the drive shaft 26.

The lower end of the pitch control rod 102 is pivotally connected at 104 to the rotating star 106 which is driven at rotor speed by means of torque scissors 107. The star 106 is rotatably mounted on the stationary star 108 by means of bearings 110 which allow relative rotation between the stars but maintain them parallel. The stationary star 108 may be moved axially with respect to the drive shaft 26 or tilted in any direction by movement of the total pitch stick 54 and the azimuth stick 52 in a manner to be more fully described hereinafter. A lever 112 is pivoted at 114 on an upwardly projecting arm 116 which is integral with the rotor pylon 118. The pylon 118 provides bearings 119 for the shaft 26. Since the rotor pylon 118 is part of the fuselage framework, the pivot point 114 provides a rigid stationary reference point. The left hand end of the lever 112 is pivotally connected at 128 to rod 130. The right hand end of the lever 112 is pivotally connected by means of bearings 120 to an inner ring 122 which is pivotally connected by means of pins 124 to an outer ring 126. The lateral control arm 132 is connected to the outer ring 126 and extends generally aft and to the left with respect to the fuselage. A longitudinal control arm 134 (Fig. 8) extending aft and to the right is connected to the outer ring 126 at substantially 90° to the lateral control arm 132.

It will be noted that the pitch control rod 102 is substantially vertical in the auto-rotative position shown in the drawings. When the blades drag back, in power-on flight, the control rod 102 will become slightly inclined. As the hunting action takes place, the blade will be damped aerodynamically as well as by the dampers 90. Thus as the blade drags back the control rod 102 becomes further inclined and the pitch of the blade 58 is decreased to allow the blade to swing forwardly. Conversely, as the blade swings forward, the control rod 102 approaches the vertical position and increases the pitch of the blade to cause it to move back to the normal power-on position.

Movement of the rod 130 will act to increase or decrease the pitch of the blades simultaneously. As the rod is moved down, the lever 112 rotates about the pivot 114 in a counterclockwise direction to move both stars upwardly and increase the pitch of the blades. Similarly, when the rod 130 is moved up the pitch of the blades will be decreased.

Cyclic variations in the pitch are obtained by moving the lateral or longitudinal control arms singularly or conjointly, dependent upon the direction of flight which is desired. It should be noted here that the inbuilt 90° lead of the control horn, customary in prior production helicopters, is not utilized in this rotor construction. In the prior construction the stars were inclined in the direction of flight and the 90° control horn lead allowed for the "aerodynamic control lag." However, in the instant construction the stars are inclined approximately 45° ahead of the tip path plane. For example, the stars are inclined forward and to the left to obtain forward flight and inclined aft and to the left to obtain flight to the left.

The simplified control mechanism for obtaining the desired movement of the stars 106, 108 is shown in Figs. 7 and 8. Directional control of flight is obtained by moving either or both of the azimuth control sticks 52. These control sticks are interconnected by rods 133, 135 so that the movement of one stick will cause corresponding movement of the other. The pivot connections for each of these sticks are the same as those employed for the others; therefore, the description of operation will be limited to consideration of but one stick.

When the pilot desires to move forward, the control stick 52 is moved forward to rotate the bell crank 136 about pivot 138 and move the rod 140 aft. Movement of rod 140 will rotate the bellcrank 142 about horizontal pivot 144 to raise rod 146, rotate the torque rod 148 which is mounted in fixed bearings 147, 149 and raise rod 150, and the longitudinal arm 134 to tilt the stars 106, 108 forward and to the left or port side. As pointed out hereinbefore, when the stars are so tilted the motion of the helicopter will be forward since the control horn does not lead the control application by 90°. Similarly, movement of the stick 52 aft will move rods 146 and 150 down to tilt the stars aft and to the right, giving a backward tilt to the tip path plane of the rotor blades and backward flight.

When it is desired to move to the right, the control stick 52 is moved to the right which causes rotation of the torque rod 152 which is both journalled and pivotally mounted at its end which is adjacent the stick in a bodily fixed self-aligning bearing 154 and is journalled in floating bearings 156, 157 adjacent its other end. When the torque rod 152 is rotated in this manner the laterally disposed arm 158 will push up on rod 160 to rotate torque rod 162, mounted in fixed bearings 161, 163, and raise lateral control rod 164. This will tilt the stars forward and to the right, inclining the tip path plane to the right to give flight to the right. Similarly, when the azimuth control stick 52 is moved to the left, arm 158, rod 160, and rod 164 will be moved down to tilt the stars aft and to the left to incline the tip path plane to the left.

Of course, motion of the azimuth control stick 52 need not be limited to these four directions but may be in any direction to cause flight of the helicopter to be in such a direction. It will now be apparent that the necessary 90° lead has been incorporated in the control mechanism for the stars rather than in the control horn.

Movement of the total pitch and throttle control stick 54 will act to increase or decrease the pitch setting of all the blades simultaneously. When the pitch is increased the throttle setting will be correspondingly increased to maintain the required engine R. P. M. through well-known synchronizing mechanisms. Adjustments of the throttle setting may be had by movement of the handle portion of the stick 54 after releasing an autolock mechanism. The details of this synchronization and adjustment form no part of this invention.

When the pilot pulls the total pitch stick 54 upwardly, the stick rotates with the torque rod 165 about horizontal pivots 166a in fixed brackets 166 to move arm 168 and rod 170 down. When the rod 170 is moved down, the torque rod 172 mounted in fixed pivots 171, 173 is rotated to move the total pitch rod 130 down and rotate the lever 112 about pivot 114 to raise the stars. It will be apparent that, due to the universal connection of lever 112 to the lower star 108, the stars would be tilted if the lateral and longitudinal control arms 132, 134 are held fixed. It is therefore necessary to compensate for movement of the total pitch stick so that the lateral and longitudinal arms will be moved a corresponding amount. Accordingly, an azimuth compensating link 174 is connected to an arm 174a on torque rod 165 and is thus mounted for movement with the latter about the horizontal pivots 166a in brackets 166 conjointly with movement of the total pitch stick 54. It will be noted that the torque rod 165 and the two arms 168 and 174a form a sort of bellcrank means rotatable about the axis of pivots 166a which is slightly eccentric to torque rod 165. Thus, as the stick 54 is pulled up to increase the pitch, the azimuth compensating link 174 is moved upwardly and lifts torque rod 152 a predetermined amount. Raising the torque rod 152 raises the points of connection to the rods 146 and 160 and causes upward movement of the lateral and longitudinal control arms to compensate for movement of lever 112.

By utilizing this free-floating construction of the rotating and stationary stars mounted on the rotor pylon, it has been possible to eliminate bearing contact between the stars and the drive shaft 26. The combination of the free-floating stars and the "clockcase" hub results in a great simplification and saving in production costs.

Referring back to Fig. 1, as the blades 58 rotate in the clockwise direction indicated, there will be a reaction couple R—R exerted about the vertical axis of the helicopter. The tail rotor 18 exerts a thrust T in the direction indicated to overcome the torque of the main rotor. However, since a couple is necessary to counteract another couple, it is necessary to exert another force in the same plane as the reaction couple R—R and the torque force T. As the tip path plane of the helicopter is inclined to the right, a force I is obtained. Now the reaction couple R—R is counteracted by the couple T—I. Heretofore the inclination of the tip path plane has been achieved by inclining the control mechanism. In this helicopter, however, the control mechanism is not inclined with respect to the rotor shaft and the necessary lateral force I is obtained by offsetting the center of gravity of the helicopter with respect to the longitudinal axis thereof.

Referring now to Fig. 5, it will be apparent that the drive shaft and consequently the center of gravity of the engine 28 is offset from the centerline of the helicopter. The reduction gearing 38 acts to reduce the engine speed to rotor speed and also to drive the rotor drive shaft 26 on the longitudinal centerline of the helicopter. Since the weight of the engine is offset from the centerline, the center of gravity of the helicopter is also offset. This will cause the entire helicopter to be slightly inclined to the right, resulting in a similar inclination of the tip path plane of the rotor blades. Under these conditions, the necessary lateral force I is obtained without inclining the control system relative to the rotor shaft. The inclination of the helicopter to the right is only a matter of one or two degrees and, therefore, causes no passenger discomfort.

While I have shown and described one presently preferred modification of this invention, obviously other modifications and adaptations will occur to those skilled in the art; therefore, I wish not to be limited in my invention only to the form shown and described, but by the scope of the following claims.

I claim:

1. In a rotary wing aircraft, an upstanding drive shaft rotatable about its longitudinal axis, a rotor driven by said shaft having variable pitch blades, mechanism operably connected to said blades for varying the pitch of said blades, swashplate means axially movable and tiltable relative to the axis of said shaft, linkage means pivotally connecting said swashplate means with said pitch varying mechanism for varying the pitch of said blades totally upon axial movement of said swashplate and for varying the pitch of said blades cyclically upon rotation of said rotor with said swashplate means tilted, manually operable means for moving said swashplate means axially to vary the pitch of said blades totally including a total pitch control lever and linkage for connecting the latter to said swashplate means, manually operable means for tilting said swashplate means to vary the pitch of said blades cyclically including a cyclic pitch control lever and linkage for connecting said cyclic pitch control lever to said swashplate means, said linkage between said cyclic pitch control lever and said swashplate means including an elongated member operably connected adjacent one of its ends to said cyclic pitch control lever and adjacent its other end to said swashplate means, means for both pivotally supporting and journalling said member on a fixed support adjacent the end thereof which is connected to said cyclic pitch control lever, a compensating link pivoted to said member adjacent the other end of the latter and an arm movable by said total pitch control lever and pivoted to said compensating link.

2. In a rotary wing aircraft, an upstanding shaft, a rotor driven by said shaft having variable pitch blades, means for varying the pitch of said blades including a swashplate movable bodily along the axis of said shaft and tiltable relative to said shaft axis, manually operable means for moving said swashplate bodily in any tilted or untilted position thereof to vary the pitch of said blades totally and for tilting said swashplate for varying the pitch of said blades cyclically as said rotor rotates in any position of axial adjustment of said swashplate, said manually operable means including a cyclic pitch control rod, pivot means mounting said rod adjacent one of its ends for movement in a vertical plane and for rotation about its longitudinal axis in said plane, bellcranks pivoted to said rod adjacent its opposite ends, a manually operable member rigidly connected to one arm of the bellcrank at one end of said rod, linkage connecting one arm of the bellcrank at the other end of said rod to said swashplate, linkage means operatively connecting the free ends of the other arms of said bellcranks, a crank arm on said rod extending laterally therefrom, means connecting the free end of said crank arm to said swashplate at a point substantially 90° from the other linkage connection thereto, a rotatable total pitch control member having laterally extended crank arm means, linkage means connecting said crank arm means to said swashplate, compensating linkage means pivotally connecting said crank arm means to said cyclic pitch control rod at a point on the later remote from the pivot means therefor, and a manually operable total pitch control stick secured to said total pitch control member for rotating the latter to move said swashplate axially and simultaneously to move said cyclic pitch control rod in said plane.

3. In a rotary wing aircraft, an upstanding shaft, a rotor driven by said shaft having variable pitch blades, means for varying the pitch of said blades including a swashplate movable bodily along the axis of said shaft and tiltable relative to said shaft axis, manually operable means for moving said swashplate bodily in any tilted or untilted position thereof to vary the pitch of said blades totally and for tilting said swashplate for varying the pitch of said blades cyclically as said rotor rotates in any position of axial adjustment of said swashplate, said manually operable means including a cyclic pitch control rod pivoted adjacent one end for movement in a substantially vertical plane and for rotation about its longitudinal axis in said plane, linkage connecting the free end of said control rod with said swashplate means at spaced points on the latter, a manually operable cyclic pitch control lever mounted on said control rod for selective movement in angularly related planes to operate said linkage to tilt said swashplate means, total pitch control means including a pivoted member, a manually operable total pitch control lever for pivoting said member, pitch control linkage connecting said total pitch control member operatively with said swashplate means, and a link pivotally connected with said pivoted member and with said cyclic pitch control rod at a point on the latter spaced from its pivotal support for moving said cyclic pitch control rod in said vertical plane to move said linkage means an amount equal to the movement of said total pitch control linkage.

References Cited in the file of this patent

UNITED STATES PATENTS

| | | |
|---|---|---|
| 2,443,393 | Landgraf | June 15, 1948 |
| 2,529,635 | Sikorsky | Nov. 14, 1950 |
| 2,599,690 | Buivid et al. | June 10, 1952 |

FOREIGN PATENTS

| | | |
|---|---|---|
| 888,158 | France | Dec. 6, 1943 |
| 1,009,222 | France | May 27, 1952 |